United States Patent
Hegna et al.

(10) Patent No.: US 7,518,953 B2
(45) Date of Patent: Apr. 14, 2009

(54) METHOD FOR DETECTING AIR GUN FAULTS IN A MARINE SEISMIC SOURCE ARRAY

(75) Inventors: Stian Hegna, Hovik (NO); Anthony James Day, Drammen (NO); Gregory Ernest Parkes, Corsham (GB)

(73) Assignee: PGS Geophysical AS, Lysaker (NO)

( * ) Notice: Subject to any disclaimer, the term of this patent is extended or adjusted under 35 U.S.C. 154(b) by 19 days.

(21) Appl. No.: 11/655,667

(22) Filed: Jan. 19, 2007

(65) Prior Publication Data

US 2008/0175102 A1 Jul. 24, 2008

(51) Int. Cl.
*G01V 1/02* (2006.01)
*G01V 1/137* (2006.01)

(52) U.S. Cl. .................................... 367/144
(58) Field of Classification Search ............ 367/13.144; 181/118
See application file for complete search history.

(56) References Cited

U.S. PATENT DOCUMENTS

| | | | | |
|---|---|---|---|---|
| 4,047,591 | A * | 9/1977 | Ward et al. ................... | 367/143 |
| 4,064,479 | A | 12/1977 | Ruehle | |
| 4,210,222 | A * | 7/1980 | Chelminski et al. ......... | 181/107 |
| 4,240,518 | A * | 12/1980 | Chelminski ................. | 367/144 |
| 4,300,653 | A * | 11/1981 | Cao et al. ................... | 181/107 |
| 4,382,486 | A | 5/1983 | Ruehle | |
| 4,564,927 | A * | 1/1986 | Kolb ........................... | 367/42 |
| 4,851,071 | A | 7/1989 | Otto | |
| 5,530,678 | A | 6/1996 | Kosalos | |
| 5,615,170 | A | 3/1997 | Chelminski | |
| 6,788,618 | B2 * | 9/2004 | Clayton et al. .............. | 367/144 |
| 6,901,028 | B2 * | 5/2005 | Clayton et al. ................ | 367/13 |
| 7,466,630 | B2 * | 12/2008 | Vaage ........................ | 367/144 |
| 2003/0202423 | A1 * | 10/2003 | Clayton et al. ................ | 367/13 |
| 2004/0022125 | A1 * | 2/2004 | Clayton et al. ................ | 367/68 |
| 2007/0263489 | A1 * | 11/2007 | Vaage ........................ | 367/144 |
| 2008/0175102 | A1 * | 7/2008 | Hegna et al. ................. | 367/144 |

FOREIGN PATENT DOCUMENTS

| | | |
|---|---|---|
| GB | 2 414 314 | 11/2005 |
| WO | WO 03/079049 | 9/2003 |

OTHER PUBLICATIONS

Tom Sutherland, United Kingdom Patent Office Search Report, dated Apr. 16, 2008.

* cited by examiner

*Primary Examiner*—Dan Pihulic
(74) *Attorney, Agent, or Firm*—E. Eugene Thigpen; Richard A. Fagin

(57) ABSTRACT

A method for determining a fault in a seismic air gun includes comparing a near field seismic signal measured during operation of the air gun to a reference near field signal and determining the existence of a fault in the air gun when a difference between the measured near field signal and the reference near field signal exceeds a selected threshold.

6 Claims, 3 Drawing Sheets

METHOD FOR DETECTING AIR GUN FAULTS IN A MARINE SEISMIC SOURCE ARRAY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic surveying. More particularly, the invention relates to techniques for determining whether one or more air guns used in a marine seismic energy source array suffer from operational faults, such as air leaks.

2. Background Art

In marine seismic surveys, a seismic energy source is used to generate seismic energy in the form of acoustic pulses or waves in a body of water such as a lake or the ocean. The seismic energy travels downward in the water, through the water bottom, and through the Earth formations underlying the water bottom. Part of the energy passing through the Earth formations underlying the water bottom is reflected upward therefrom at acoustic impedance boundaries in the Earth formations. The upward traveling energy is detected by sensors such as hydrophones towed in one or more streamer cables disposed near the water surface, or by sensors disposed in cables along the water bottom. The sensors convert the detected energy to electrical or optical signals. The electrical or optical signals are then conditioned and interpreted to provide information both as to the composition and the structure of the various subsurface Earth formations. Such information is used particularly to determine the possibility that such Earth formations may contain mineral deposits such as hydrocarbons.

Several different types of seismic energy sources have been used in the past to produce seismic energy in a form required in marine seismic surveys. For example, explosives have been used as a marine seismic energy source, but explosives are dangerous and are considered ecologically unacceptable for such purposes. Another type of marine seismic energy source, called a gas gun, includes detonating combustible gases in a chamber and then expelling the resultant gas charge into the water to produce the seismic energy. Certain risks are associated with the use of such gas guns, and as such gas guns are not widely used.

The most frequently used marine seismic energy source at present is known as an "air gun." In an air gun, a charge of compressed air or inert gas under high pressure, on the order of 2000-6000 pounds per square inch (130 to 400 bars), is supplied to a chamber within the gun. When the air gun is actuated or "fired", a valve rapidly opens to discharge the pressurized air or gas from the chamber into the water. The valve then closes and the chamber is repressurized with air or gas from a source such as a compressor. Such firing can be repeated as often as desired and within the capacity of the source to repressurize the chamber. The air or gas discharges in a bubble or plurality of such bubbles in the water.

A single air gun produces a seismic pulse having acoustic energy content with respect to frequency (the source "signature") related to a complex pressure interaction between the air bubbles and the water that causes the bubbles to oscillate as they float toward the water surface. Such interaction can produce extraneous bursts of seismic energy following the initial energy burst. The amplitude and periodicity of these bubble-generated extraneous bursts depend on, among other factors, the depth of the gun in the water and the size of the pressurized air chamber in the gun. It is therefore known in the art to use an array of air guns having various different chamber sizes, and firing such guns contemporaneously or in a preselected timing sequence. Such firing of an array of air guns provides several advantages over firing a single air gun. First, the total amount of energy being imparted into the Earth's subsurface for each seismic "shot" is increased. In addition, the different chamber sizes for the various guns will produce different bubble responses, causing the bubble responses to tend to cancel each other. The directivity of the energy source toward the water bottom can be improved, because other than directly below the source array, some frequencies in the seismic energy will be attenuated by the spatial distribution of the guns in the array. Design considerations for air gun arrays to attain certain spectral and directivity characteristics are disclosed in marine seismic surveys, a seismic energy source is used to generate seismic energy in the form of acoustic pulses or waves in a body of water such a lake or the ocean. The seismic energy travels downward in the water, through the water bottom, and through the Earth formations underlying the water bottom. Part of the energy passing through the Earth formations underlying the water bottom is reflected upward therefrom at acoustic impedance boundaries in the Earth formations. The upward traveling energy is detected by sensors such as hydrophones towed in one or more streamer cables disposed near the water surface, or by sensors disposed in cables along the water bottom. The sensors convert the detected energy to electrical or optical signals. The electrical or optical signals are then conditioned and interpreted to provide information both as to the composition and the structure of the various subsurface Earth formations. Such information is used particularly to determine the possibility that such Earth formations may contain mineral deposits such as hydrocarbons.

Adjusting the number, position, operating pressure and chamber volumes of the air-guns in an array changes its signature. The array can thus be tailored to the requirements of a particular survey depending on the depth and geologic nature of the target interface of interest and the overlying rocks. However, in the event of equipment failure, the signature of the array will change. If the detrimental effect on the signature of the whole array is severe, acquisition must cease while the problem is rectified. One such failure mode is leakage of the high-pressure air that supplies the guns into the water column. The effects of such air-leaks can include suppression of the reflection of the wave-field from the water surface near the array for guns in the vicinity of the leak and extra energy from oscillation of the bubbles released into the water column.

Thus, a need exists for a method to identify air-gun faults as early as possible. Such identification will allow planned preventative maintenance to be carried out at a convenient time, which is preferable to a forced cessation of acquisition when a serious fault occurs.

SUMMARY OF THE INVENTION

A method for determining a fault in a seismic air gun according to one aspect of the invention includes comparing a near field seismic signal measured during operation of the air gun to a reference near field signal. The existence of a fault in the air gun is determined when a difference between the measured near field signal and the reference near field signal exceeds a selected threshold.

Another aspect of the invention is a method for seismic surveying. A method according to this aspect of the invention includes towing at least one air gun array through a body of water. The air gun array includes a plurality of air guns and corresponding near field sensors. At selected times, the air guns in the at least one array are actuated and signals generated by the near field sensors are recorded. The near field signals are compared to corresponding reference signals. Existence of a fault in at least one of the air guns is determined when a difference between the recorded near field signal and the corresponding reference signal exceeds a selected threshold.

Other aspects and advantages of the invention will be apparent from the following description and the appended claims.

DETAILED DESCRIPTION

Figure 1:
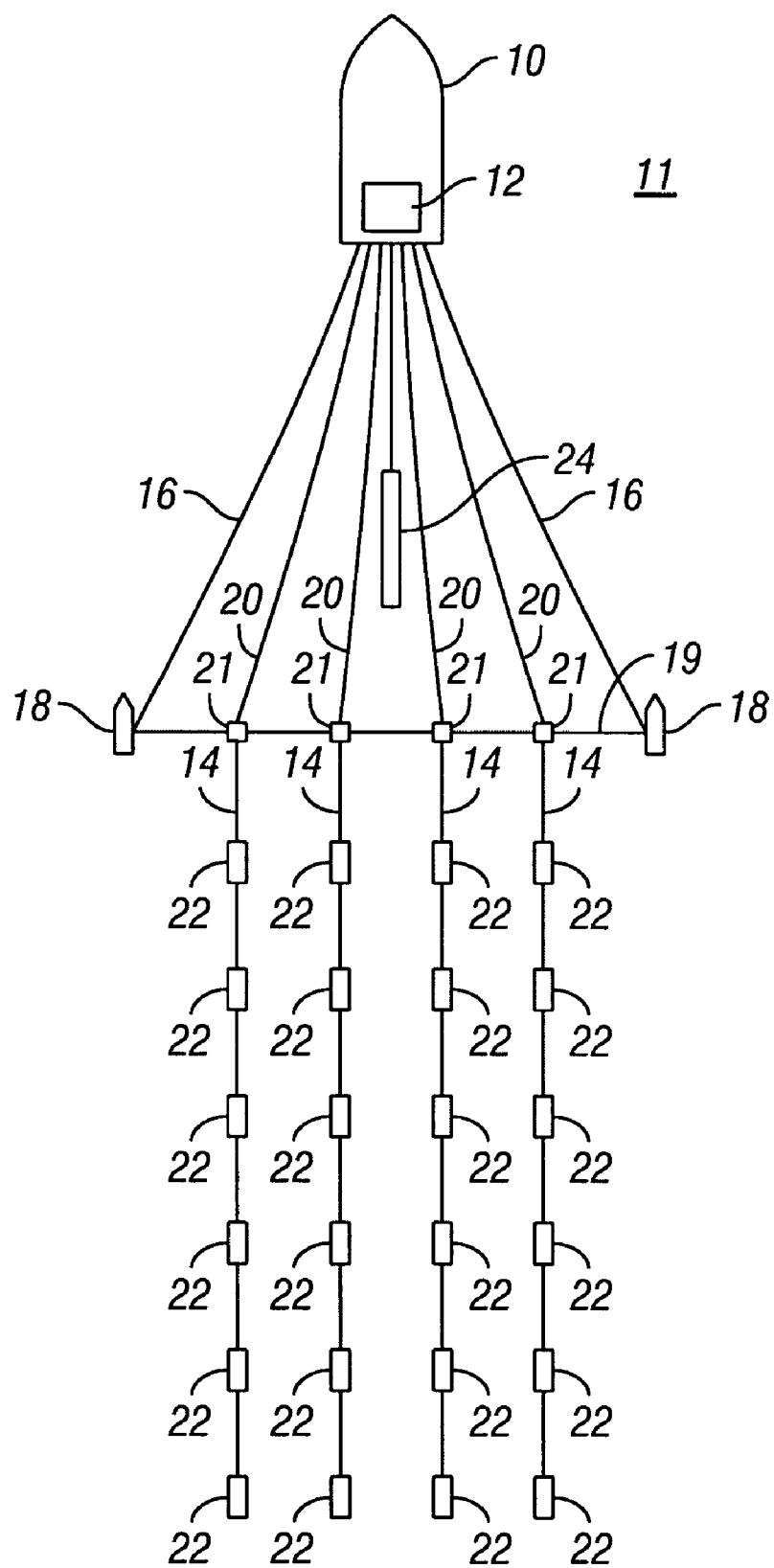
FIG. 1 shows an example marine seismic data acquisition system including a seismic source array.

An example marine seismic data acquisition system that may be used with the invention is shown schematically in FIG. 1. The acquisition system includes a seismic vessel 10 that moves along the surface of a body of water 11 such as a lake or the ocean. The seismic vessel 10 includes thereon equipment, shown generally at 12 and described for convenience herein as a "recording system" that may include (none shown separately in FIG. 1) data recorders, navigation devices such as global positioning system ("GPS") receivers and seismic source control devices.

The system may include a plurality of seismic sensor streamers 14 towed by the seismic vessel 10 as shown in FIG. 1 or by a different vessel. The streamers 14 are generally cables that extend behind the towing vessel for a certain distance, and each streamer 14 includes thereon at spaced apart locations seismic sensors 22. The seismic sensors 22 are typically hydrophones but may also be geophones or combinations of hydrophone and geophone. Geometry of the streamers is maintained by various towing devices including lateral force generating devices called "paravanes" 18 disposed at the end of paravane lead in ropes 16. The streamers 14 are coupled at their forward end to respective termination 21 which couples the streamer 14 to a respective lead in cable 20. the paravane lead in ropes 16 and lead in cables 20 may be deployed from the vessel 10 and retrieved thereon by winches (not shown) or similar spooling device. The lateral separation of the paravanes 18 may be limited by a spreader cable 19 ultimately to maintain the geometry of the entire array of streamers 14.

The seismic vessel 10 may also tow, or another vessel may tow one or more seismic source arrays 24. Only one such array is shown in FIG. 1 for clarity. The source array 24 typically includes a plurality of air guns (FIG. 2) of various chamber sizes, as will be explained with reference to FIG. 2 such that upon selectably timed actuations of all the individual air guns in the array 24 a seismic energy pulse of suitable spectral content is imparted to the water 11. The manner of recording and processing signals detected by the various seismic sensors 22 is well known in the art and will not be further described herein.

Figure 2:
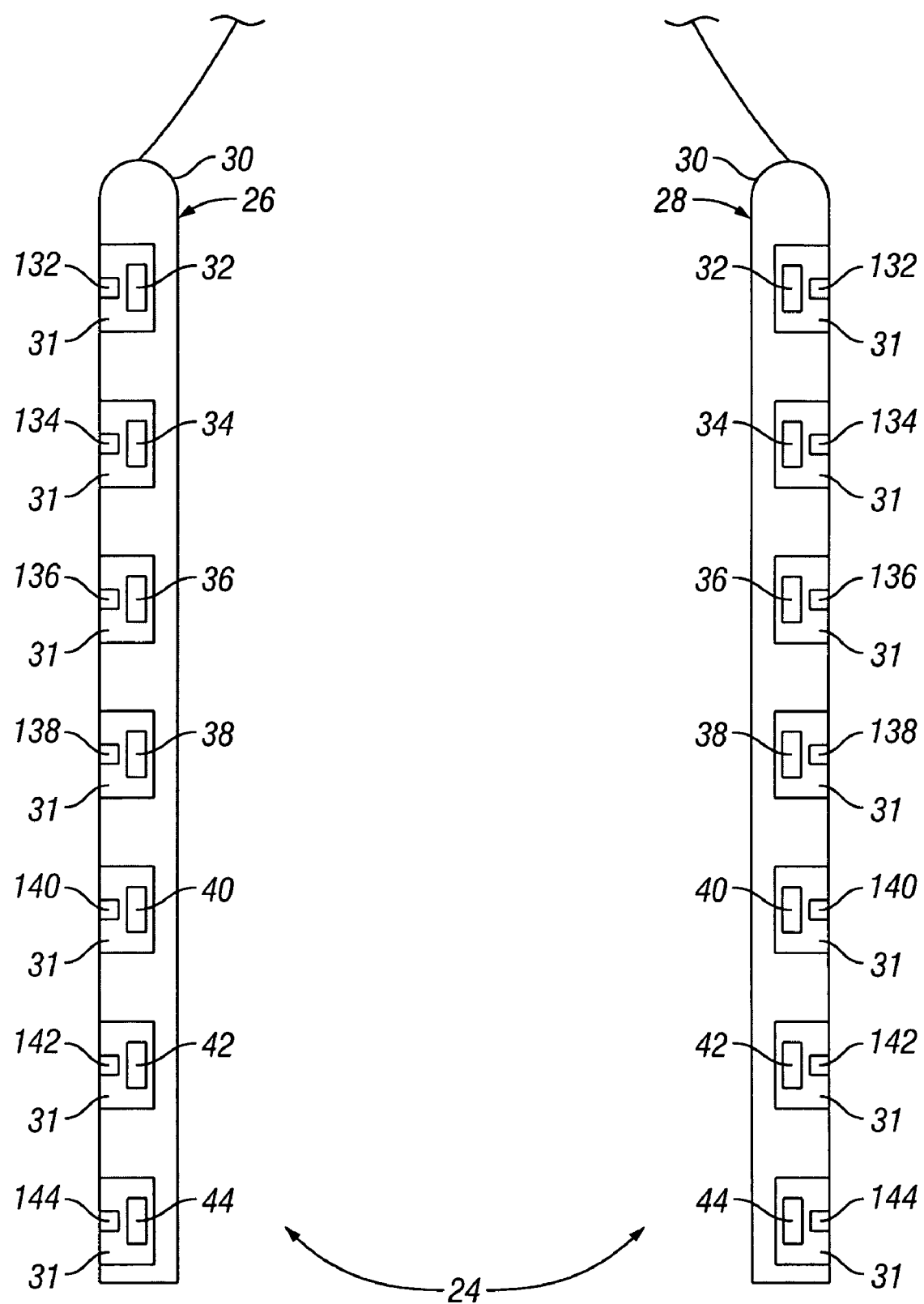
FIG. 2 shows the seismic source array of FIG. 1 in more detail for purposes of explaining the measurements used in various implementations of a method according to the invention.

The source array 24 is shown in more detail in FIG. 2. The source array may include a plurality of sub-arrays 26 and 28. Only two such sub-arrays are shown in FIG. 2, but the number of sub-arrays in any implementation is not a limit on the scope of this invention. Each sub-array 26, 28 may include a housing 30. The housing may be an open frame or may be a torpedo shaped device to reduce friction of movement of the housing 30 through the water (11 in FIG. 1). The housing 30 may include openings 31 exposed to the water in each of which is disposed an air gun (32 through 44). Each air gun 32-44 may have a differently sized air chamber (not shown in FIG. 2) to cause each such air gun to generate a pressure wave of a particular spectral content when the air gun is discharged. See, e.g., U.S. Pat. No. 4,064,479 issued to Ruehle, and in U.S. Pat. No. 4,382,486 issued to Ruehle, referred to in the Background section herein, for example. In some implementations, more than one air gun may be associated with a respective opening 31. The particular configuration of housing, openings and associated air guns is not intended to limit the scope of this invention.

Each air gun 32-44 may have associated therewith a near field sensor 132-144. The near field sensors 132-144 are typically hydrophones and are disposed at a distance from each corresponding air gun 32-44 not more than one half the wavelength of the acoustic energy emitted by the corresponding air gun 32-44. The output of each near field sensor is coupled to the recording system (12 in FIG. 1) for analysis according to the invention. Analysis of the near field sensor signals is used in the invention to assist in determining operating faults in one or more of the air guns.

Having shown an example of a seismic air gun array having near field sensors, how the near field measurements are used in a method according to the invention will now be explained. The near-field sensor (132-144 in FIG. 2) signal actually detected and/or recorded may be characterized a convolution of various signal components according to the following expression:

$$s(t) = h(t) * e(t) * w(t) * n(t) \qquad (1)$$

where s(t) represents the amplitude of the near field sensor signal actually measured and/or recorded with respect to time, h(t) represents the near field sensor response (meaning its signal output with respect to a known energy input), e(t) represents any systematic noise introduced into the recording system such as electrical noise, w(t) represents the ideal near-field sensor response (the near-field hydrophone response that would have been measured if the system were perfect and the air guns were performing as specified with respect to certain parameters such as air gun depth in the water, air charge pressure, etc.), and n(t) represents any air gun performance related variations caused by, for example, autofires (actuation of the air gun absent a control signal from the recording system), air leaks, charge pressure variations, or by any other variations related to the instrumentation (e.g., varying cross-feed). The parameters represented by n(t) may be described generally as "air gun performance factors."

In the invention a "reference" near-field sensor signal can be derived, for example from a near field sensor signal recorded during a period with none of the above-described air gun performance factors. The air gun performance factors are expressed in equation (1) as n(t) as explained above, and the reference signal can be expressed as a convolution according to the following expression:

$$s_r(t)=h(t)*e(t)*w(t) \quad (2)$$

where $s_r(t)$ represents the reference near field sensor signal. Then equation (1) can be expressed as a convolution of the reference signal with the air gun performance factors as shown below:

$$s(t)=s_r(t)*n(t) \quad (3)$$

In the frequency domain equation (2) can be written as:

$$S(\omega)=S_r(\omega)N(\omega) \quad (4)$$

where $S(\omega)$, $S_r(\omega)$, and $N(\omega)$ represent the complex Fourier transform of the time domain signals expressed in equation (3).

The amplitude and phase spectra of the Fourier transform of $S(\omega)$, $S_r(\omega)$ and $N(\omega)$ can be expressed as:

$$S(\omega)=A_S(\omega)\exp[i\phi_S(\omega)]$$

$$S_r(\omega)=A_{Sr}(\omega)\exp[i\phi_{Sr}(\omega)]$$

$$N(\omega)=A_N(\omega)\exp[i\phi_N(\omega)] \quad (5)$$

where $A_S(\omega)$ and $\phi_S(\omega)$ are the amplitude and phase, respectively, of $S(\omega)$. By substituting equation (5) into equation (4), the following expressions for amplitude and phase spectra of the recorded near field sensor signal are determined:

$$A_S(\omega)=A_{Sr}(\omega)A_N(\omega)$$

$$\phi_S(\omega)=\phi_{Sr}(\omega)+\phi_N(\omega) \quad (6)$$

To convolve the reference signal $s_r(t)$ and the air gun performance factors n(t), their amplitude spectra are multiplied, and the phase spectra are added. Therefore, the time series of n(t), which represents only the variations in the near-field sensor response (the air gun performance factors), and excludes any system response characteristics of the reference signal, can be derived through the following expressions in the frequency domain:

$$A_N(\omega)=A_S(\omega)/A_{Sr}(\omega)$$

$$\phi_N(\omega)=\phi_S(\omega)-\phi_{Sr}(\omega) \quad (7)$$

In other words, the complex Fourier spectrum $N(\omega)$ of the air gun performance factors, composed of an amplitude component and a phase component, can be determined by: (a) dividing the amplitude spectrum of the near field sensor signal actually measured or recorded by the amplitude spectrum of the reference near field signal to determine the amplitude component; and (b) by subtracting the phase spectrum of the near field sensor signal actually recorded from the phase spectrum of the reference near field signal to determine the phase component. The time series of the air gun performance factors n(t), if desired, can then be derived by an inverse Fourier transform of the complex Fourier spectrum $N(\omega)$.

If the amplitude spectral quotient determined above from equation (7) is approximately unity for all frequencies in the bandwidth of the near field sensor signals, and the phase spectral difference is approximately zero for all such frequencies, then it may be inferred that the particular air gun associated with the near field sensor under evaluation is operating correctly.

In a particular implementation, the reference near field sensor signal may be determined by summing or stacking a plurality of individual near field sensor signals recorded closely in time to each other. For example, a reference signal may be generated by summing or stacking a selected number, e.g., five recorded signals preceding in time the signal under evaluation with five recorded signals following in time the signal being evaluated.

Figure 3A:
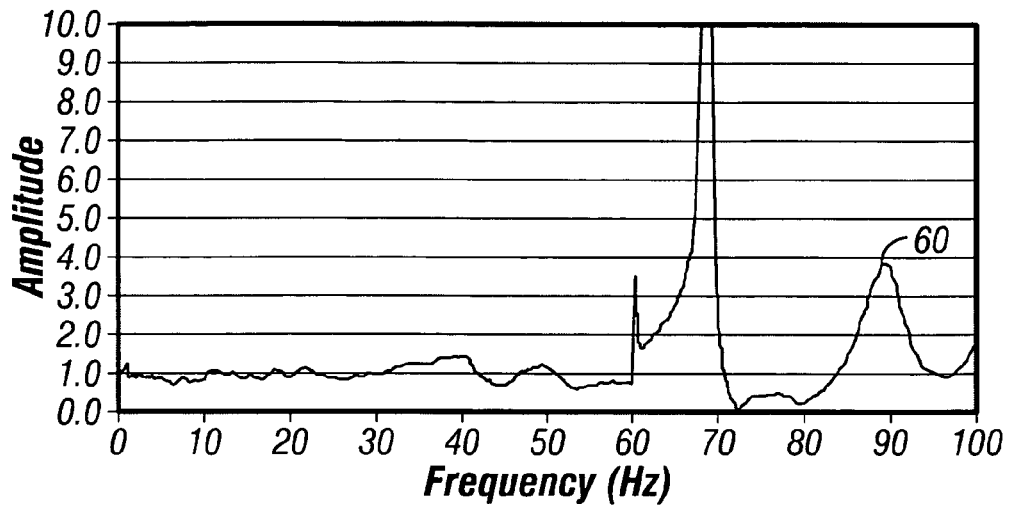
FIGS. 3A, 3B and 3C show graphs of amplitude spectra of an air gun performance factor determined from measurements made by a near field sensor.
Figure 3B:
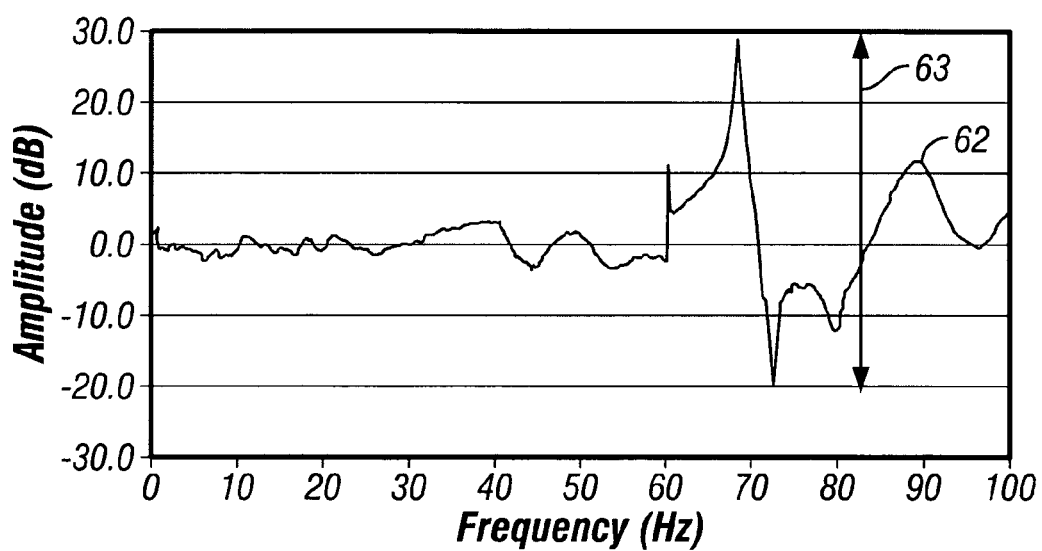
Figure 3C:
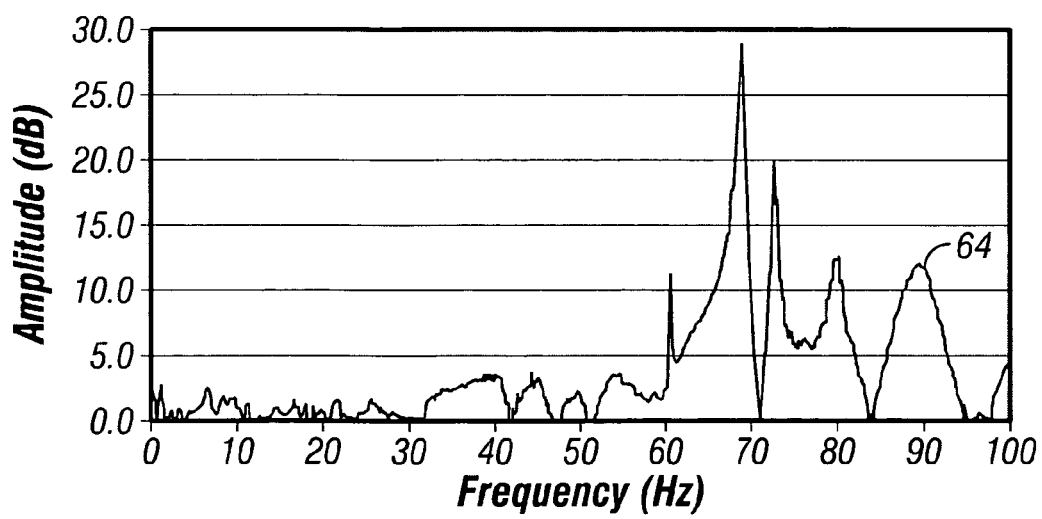

It has been determined by evaluation of results from actual seismic surveys including air leaks in certain air guns in an air gun array that air leaks may be readily identified by evaluating the maximum difference between the highest amplitude component in the measured near field sensor spectrum and the lowest amplitude component therein. An example of output of the foregoing procedure to determine $N(\omega)$ is shown graphically in FIGS. 3A, 3B and 3C. FIG. 3A shows, in curve 60 plotted on a linear amplitude ratio scale, the amplitude of the air gun performance factor at each of a plurality of frequencies generally within the expected bandwidth of a near field signal. FIG. 3B shows, in curve 62, the same result as in FIG. 3A wherein curve 62 is plotted on a decibel (dB) scale. FIG. 3C shows, at curve 64, the absolute value of curve 62. Line 63 in FIG. 3B illustrates a maximum difference between the highest amplitude component and the lowest amplitude component. It has been determined through evaluation of data acquired during actual operation of various air gun arrays that proper operation of air guns in an array may be inferred when the maximum difference (63 in FIG. 3B) is less than about 2 dB. The average value of the amplitude component of $N(\omega)$ over the entire bandwidth may also be calculated. It has also been determined through actual operation of air gun arrays that proper operation may be inferred when the average value of the amplitude component of $N(\omega)$ is less than about 1 dB.

The frequency domain evaluation procedure described above may be applied to all the near-field sensor signals in any particular a source array, and suitable attributes for identifying anomalous operation can be calculated for each measured near field signal. Such attributes may include maximum amplitude difference and average amplitude as explained above with reference to FIGS. 3A, 3B and 3C. Thus, the spatial distribution of anomalous operation with respect to the various air gun positions within the air gun array may be obtained. The spatial distribution of such anomalous results may be used to diagnose the nature of the fault. In the case of air leaks, for example, a stream of bubbles can be emitted into the water which stream then rises to the surface. As the array is towed through the water, the result is a rising column of bubbles streaming backward and upward from the leak position. Therefore, any anomalies are greatest immediately behind the leak and decrease in magnitude backwards along the array. Thus the presence and position of an air-leak can be identified by determining the spatial distribution of anomalous response of the near field sensors in the source array.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for seismic surveying, comprising:
   towing at least one air gun array through a body of water, the air gun array including a plurality of air guns and corresponding near field sensors;
   at selected times, actuating the air guns in the at least one array and recording signals generated by the near field sensors;
   comparing the near field signals to corresponding reference signals; and determining when a difference between the near field signal and the corresponding reference signal exceeds a selected threshold for each of the air guns; and determining a type of fault based on spatial distribution of the air guns for which the difference exceeds the threshold.

2. The method of claim 1 wherein the comparing is performed in the frequency domain.

3. The method of claim 2 wherein the comparing comprises determining a ratio of amplitude spectra of the near field signals with respect to the corresponding reference signals and determining a difference between phase spectra of the near field signals and the corresponding reference signals.

4. The method of claim 3 further comprising:

determining at least one of a maximum difference in the amplitude spectrum of the measured signals and an average value of the amplitude spectrum at each air gun; and determining existence of a fault when at least one of the maximum difference and the average amplitude exceeds a selected threshold.

5. The method of claim 1 wherein the reference trace is generated by stacking a plurality of measured near field signals.

6. The method of claim 1 wherein the type of fault comprises an air leak.

* * * * *